United States Patent
Mansouri

(10) Patent No.: US 8,275,574 B2
(45) Date of Patent: Sep. 25, 2012

(54) CORONA PHENOMENA DETECTION

(75) Inventor: Ali Reza Mansouri, Bothell, WA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 12/325,737

(22) Filed: Dec. 1, 2008

(65) Prior Publication Data

US 2010/0134061 A1 Jun. 3, 2010

(51) Int. Cl.
  *H02K 11/00* (2006.01)
  *H02K 3/40* (2006.01)
(52) U.S. Cl. ........................................ 702/171; 702/159
(58) Field of Classification Search .................. 702/159, 702/171, 182–183; 318/490; 310/196
  See application file for complete search history.

(56) References Cited

U.S. PATENT DOCUMENTS

| | | | |
|---|---|---|---|
| 3,739,272 A | | 6/1973 | McKean |
| 4,063,168 A | * | 12/1977 | Franke ............................ 324/72 |
| 4,158,169 A | | 6/1979 | Harold et al. |
| 4,245,187 A | | 1/1981 | Wagner et al. |
| 5,311,420 A | | 5/1994 | Zarfoss et al. |
| 6,545,485 B1 | * | 4/2003 | Sanderson ................... 324/536 |

OTHER PUBLICATIONS

Vahidi et al, "Corona Detection on Surfaces of Insulators Using Ultrasound Sensors and Fibre-optic Transmission Systems," Apr. 12, 2005.*

* cited by examiner

*Primary Examiner* — Sujoy Kundu
(74) *Attorney, Agent, or Firm* — Klintworth & Rozenblat IP LLC

(57) ABSTRACT

A system for automatically detecting corona effects in operating dynamic electromechanical equipment may include: at least one sensor connected to operating dynamic electromechanical equipment, a controller connected to the at least one sensor and to the operating dynamic electromechanical equipment; and a corona phenomena detection device. The at least one sensor may be adapted to measure behavior of emitted signals of the operating dynamic electromechanical equipment. The controller may be adapted to adjust emitted signals of the operating dynamic electromechanical equipment to correct for errors detected by the sensor in the emitted signals The corona phenomena detection device may be adapted to automatically detect corona effects of the dynamic electromechanical equipment. The corona phenomena detection device may be connected to, or embedded in, the dynamic electromechanical equipment during manufacture of the dynamic electromechanical equipment, or retro-fitted to the dynamic electromechanical equipment.

32 Claims, 4 Drawing Sheets

CORONA PHENOMENA DETECTION

BACKGROUND OF THE DISCLOSURE

Dynamic electromechanical equipment, used in the aircraft industry and in other non-aircraft industries, typically experience corona effects (i.e. electrical losses) during extensive use. Corona effects typically increase as the voltage is increased. The existing systems and methods for detecting corona effects typically do so during testing of the dynamic electromechanical equipment in testing facilities. As a result, during normal day-to-day operation of the equipment, the corona effects may be unknown. This may result in damage to the equipment, and/or failure of the equipment which may lead to increased cost. In order to determine the corona effects of the equipment, the equipment may need to be taken out of service in order to determine the extent of the corona effects. This may result in down-time for the equipment resulting in increased cost and delays. Moreover, special testing equipment may be needed to conduct the testing resulting in further cost.

A system and/or method is needed to decrease one or more problems associated with one or more of the existing systems and/or methods for detecting corona effects in dynamic electromechanical equipment.

SUMMARY OF THE DISCLOSURE

In one aspect of the disclosure, a system is provided for automatically detecting corona effects in operating dynamic electromechanical equipment. The system may include: at least one sensor connected to operating dynamic electromechanical equipment, a controller connected to the at least one sensor and to the operating dynamic electromechanical equipment; and a corona phenomena detection device for automatically detecting corona effects of the dynamic electromechanical equipment. The at least one sensor may be adapted to measure behavior of emitted signals of the operating dynamic electromechanical equipment. The controller may be adapted to adjust emitted signals of the operating dynamic electromechanical equipment to correct for errors detected by the at least one sensor in the emitted signals. The corona phenomena detection device may be at least one of connected to the dynamic electromechanical equipment during manufacture of the dynamic electromechanical equipment and retrofitted to the dynamic electromechanical equipment.

In another aspect of the disclosure, a method is disclosed of automatically detecting corona effects in operating dynamic electromechanical equipment during regular, day-to-day operation of the equipment. In one step, the dynamic electromechanical equipment may be operated during regular, day-to-day operation. In another step, behavior of emitted signals of the operating dynamic electromechanical equipment may be measured using at least one sensor. In an additional step, the emitted signals of the operating dynamic electromechanical equipment may be adjusted, using a controller, to correct for errors detected by the at least one sensor in the emitted signals. In still another step, corona effects may be automatically detected, using a corona phenomena detection device, in the dynamic electromechanical equipment during regular, day-to-day operation.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
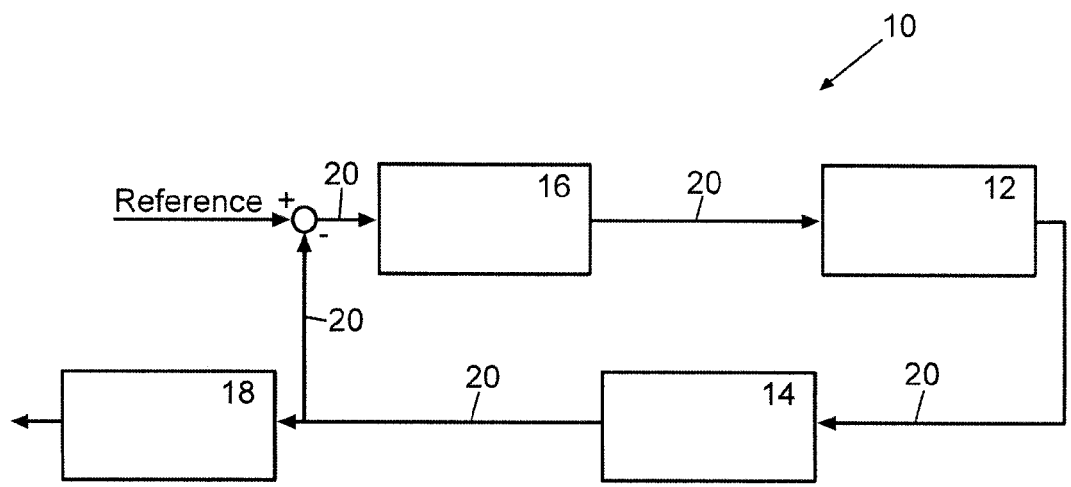
FIG. 1 shows a block diagram of one embodiment of a system for automatically detecting corona effects in operating dynamic electromechanical equipment.

FIG. 1 shows a block diagram of one embodiment of a system 10 for automatically detecting corona effects in operating dynamic electromechanical equipment 12 which may be operating during regular, day-to-day, intended operation of the equipment 12. The system 10 may comprise at least one sensor 14, a controller 16, and a corona phenomena detection device 18. In other embodiments, the system 10 may include varying components.

The dynamic electromechanical equipment 12 may comprise a motor, a generator, aircraft equipment, non-aircraft equipment, and/or another type of dynamic electromechanical equipment. The dynamic electromechanical equipment 12 may emit signals 20 during operation. The at least one sensor 14 may comprise a current probe, a speed sensor, an encoder, a back EMF sensor, a hall-effect sensor, a volt-meter, and/or another type of sensor. The at least one sensor 14 may be connected to the operating dynamic electromechanical equipment 12 for measuring behavior of the emitted signals 20. The controller 16 may be connected to the at least one sensor 14 and to the operating dynamic electromechanical equipment 12. The controller 16 may be adapted to adjust the emitted signals 20 in order to correct for errors detected by the at least one sensor 14 in the emitted signals 20.

The corona phenomena detection device 18 may be connected to the at least one sensor 14, the controller 16, and to the dynamic electromechanical equipment 12 via the controller 16. The corona phenomena detection device 18 may have been connected to the dynamic electromechanical equipment 12 during manufacture of the dynamic electromechanical equipment 12. The corona phenomena detection device 18 may be adapted to automatically detect corona effects of the dynamic electromechanical equipment 12 during regular, day-to-day, intended operation of the equipment 12.

Figure 2:
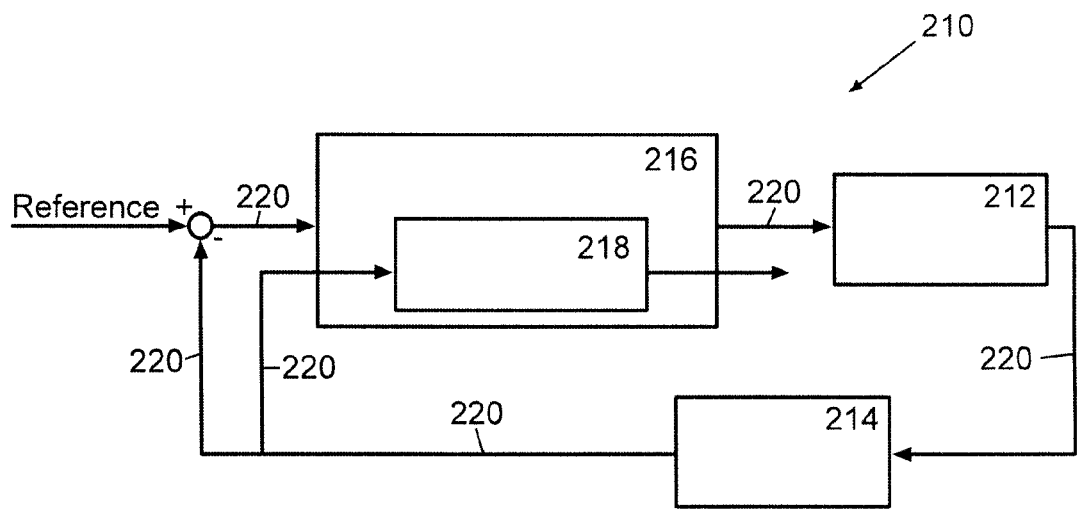
FIG. 2 shows a block diagram of another embodiment of a system for automatically detecting corona effects in operating dynamic electromechanical equipment.

FIG. 2 shows a block diagram of another embodiment of a system 210 for automatically detecting corona effects in operating dynamic electromechanical equipment 212 which may be operating during regular, day-to-day, intended operation of the equipment 212. The equipment 212 may be emitting signals 220. The system 210 may comprise at least one sensor 214, a controller 216, and a corona phenomena detection device 218. In other embodiments, the system 210 may include varying components. The system 210 of FIG. 2 may be identical to the system 10 of FIG. 1 in every respect except the corona phenomena detection device 218 of FIG. 2 may be embedded in the controller 216. The corona phenomena detection device 218 may have been retrofitted to the dynamic electromechanical equipment 212 in order to automatically detect corona effects during regular, day-to-day intended operation of the equipment 212.

Figure 3:
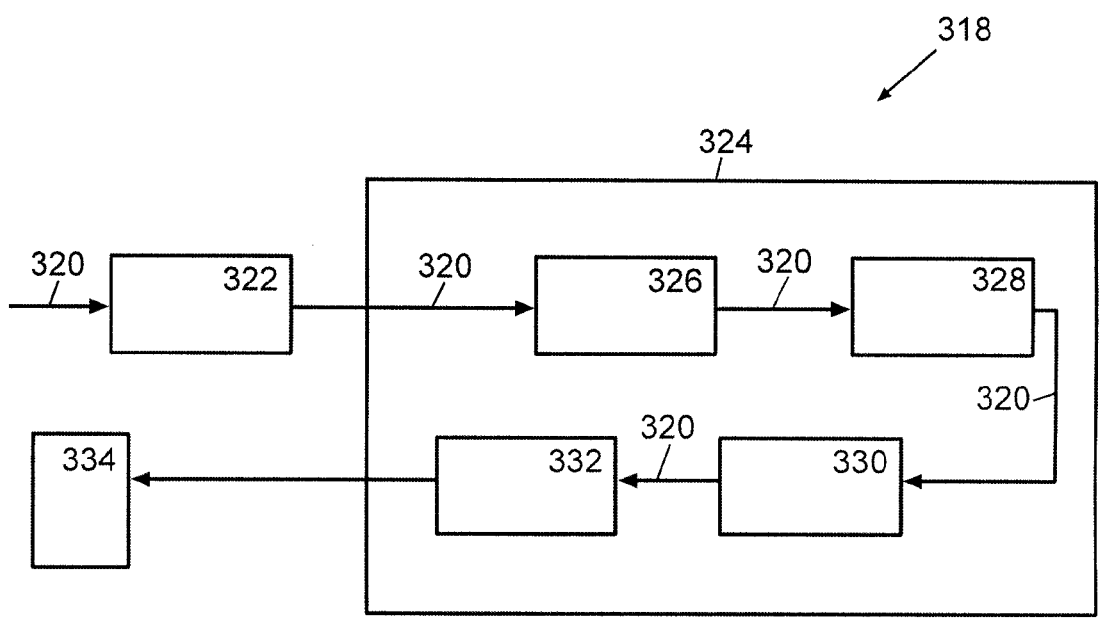
FIG. 3 shows a block diagram of one embodiment of a corona phenomena detection device.

FIG. 3 shows a block diagram of one embodiment of a corona phenomena detection device 318. The corona phenomena detection device 318 of FIG. 3 may be substituted for the corona phenomena detection devices 18 and 218 of FIGS. 1 and 2. The corona phenomena detection device 318 may comprise a high-bandwidth data acquisition device 322, and a digital signal processor 324. In other embodiments, the corona phenomena detection device 318 may comprise varying components. The high-bandwidth data acquisition device 322 may be adapted to conduct data acquisition on emitted signals 320. The emitted signals 320 may be identical to the emitted signals 20 and 220 of the operating dynamic electromechanical equipment 12 and 212 of FIGS. 1 or 2, and may have passed through the identical components of FIGS. 1 or 2. For instance, the emitted signals 320 may have been emitted by the operating dynamic electromechanical equipment 12 and 212 of FIGS. 1 and 2, and may have passed through the at least one sensor 14 and 214 of FIGS. 1 and 2.

The digital signal processor 324 may comprise a signal sampling component 326, a filtering and processing component 328, a corona detection component 330, and an alert component 332. In other embodiments, the digital signal processor 324 may comprise varying components. The signal sampling component 326 may be adapted to digitally sample the emitted signals 320. The filtering and processing component 328 may be adapted to filter and process the sampled emitted signals 320. The corona detection component 330 may be adapted to automatically detect corona effects, using an algorithm, of the operating electromechanical equipment 12 and 212 of FIGS. 1 or 2 based on the sampled, filtered, and processed emitted signals 320. The alert component 332 may be adapted to alert an operator 334 of the dynamic electromechanical equipment 12 or 212 of FIGS. 1 or 2 of detected corona effects in order to allow for corrective action to be taken. Based on the alert, the operator 334 may shut down the operating dynamic electromechanical equipment 12 or 212, provide maintenance to the operating dynamic electromechanical equipment 12 or 212, repair the operating dynamic electromechanical equipment 12 or 212, and/or take other corrective action.

Figure 4:
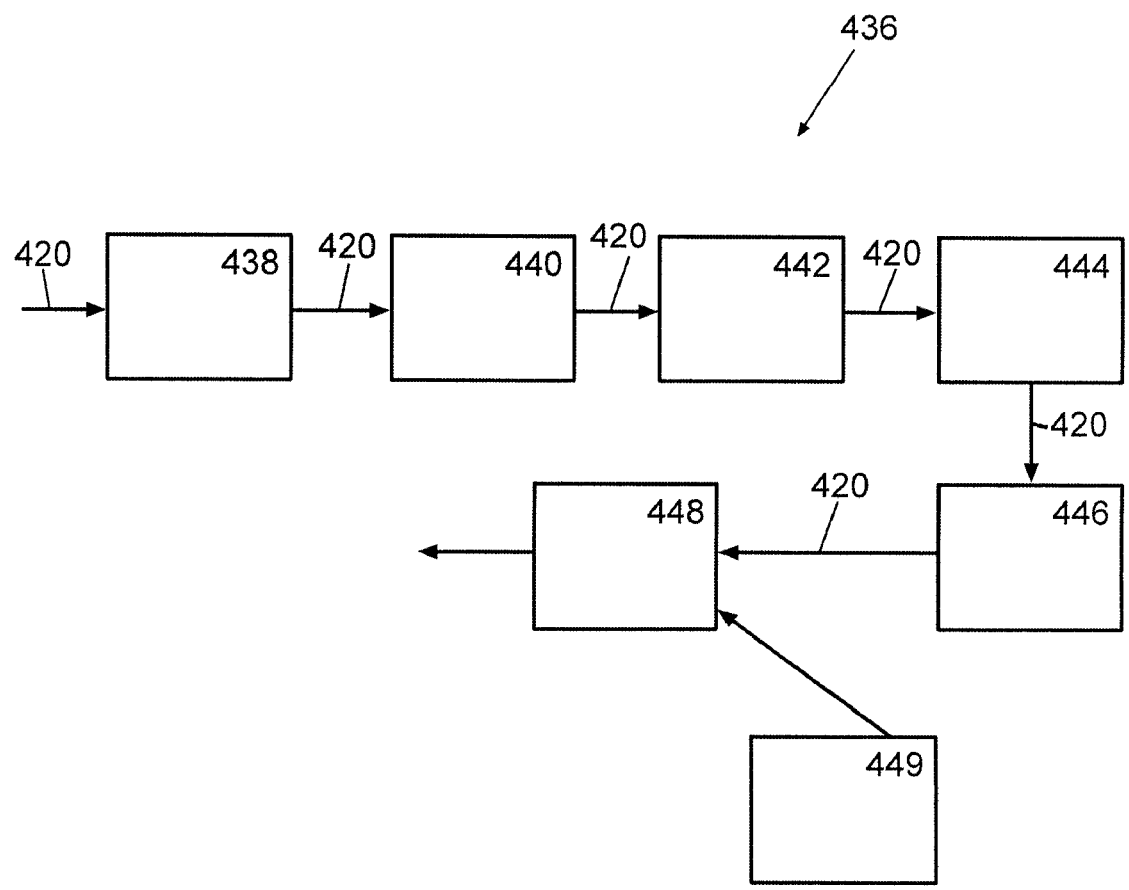
FIG. 4 shows a block diagram of one embodiment of an algorithm which may be followed in order to automatically detect corona effects of operating electromechanical equipment.

FIG. 4 shows a block diagram of one embodiment of an algorithm 436 which the corona detection component 330 of FIG. 3 may follow in order to automatically detect corona effects of the operating electromechanical equipment 12 and 212 of FIGS. 1 and 2 based on the sampled, filtered, and processed emitted signals 320 of FIG. 3. In order to implement the algorithm 436 of FIG. 4, the corona detection component 330 of FIG. 3 may comprise, as shown in FIG. 4, a capture component 438, a Fourier component 440, a coefficient extraction component 442, a mean coefficient component 444, a signature extraction component 446, and a corona effect component 448. In other embodiments, the corona detection component 330 of FIG. 3 may utilize varying components.

The capture component 438 may be adapted to capture a waveform of sampled, filtered, and processed emitted signals 420. The sampled, filtered, and processed emitted signals 420 may be identical to the sampled, filtered, and processed emitted signals 320 of FIG. 3. The Fourier component 440 may be adapted to do a Fourier transformation on the waveform captured by the capture component 438. The coefficient extraction component 442 may be adapted to extracting coefficients of the Fourier transformation. The mean coefficient component 444 may be adapted to average the extracted coefficients of the Fourier transformation. The signature extraction component 446 may be adapted to extract a signature using the averaged extracted coefficients. The corona effect component 448 may be adapted to detect corona effects of the operating dynamic electromechanical equipment 12 and 212 of FIGS. 1 and 2 based on a comparison of the signature extracted by the signature extraction component 446 with a reference corona signature 449. The reference corona signature 449 may comprise previously tested and determined corona signatures, which signify different stages of corona effects, of at least one of the operating dynamic electromechanical equipment 12 and 212 of FIGS. 1 and 2, and second operating dynamic electromechanical equipment substantially similar to the operating dynamic electromechanical equipment 12 and 212 of FIGS. 1 and 2. The reference corona signature may have been determined in a laboratory or during other experimental testing conditions.

Figure 5:
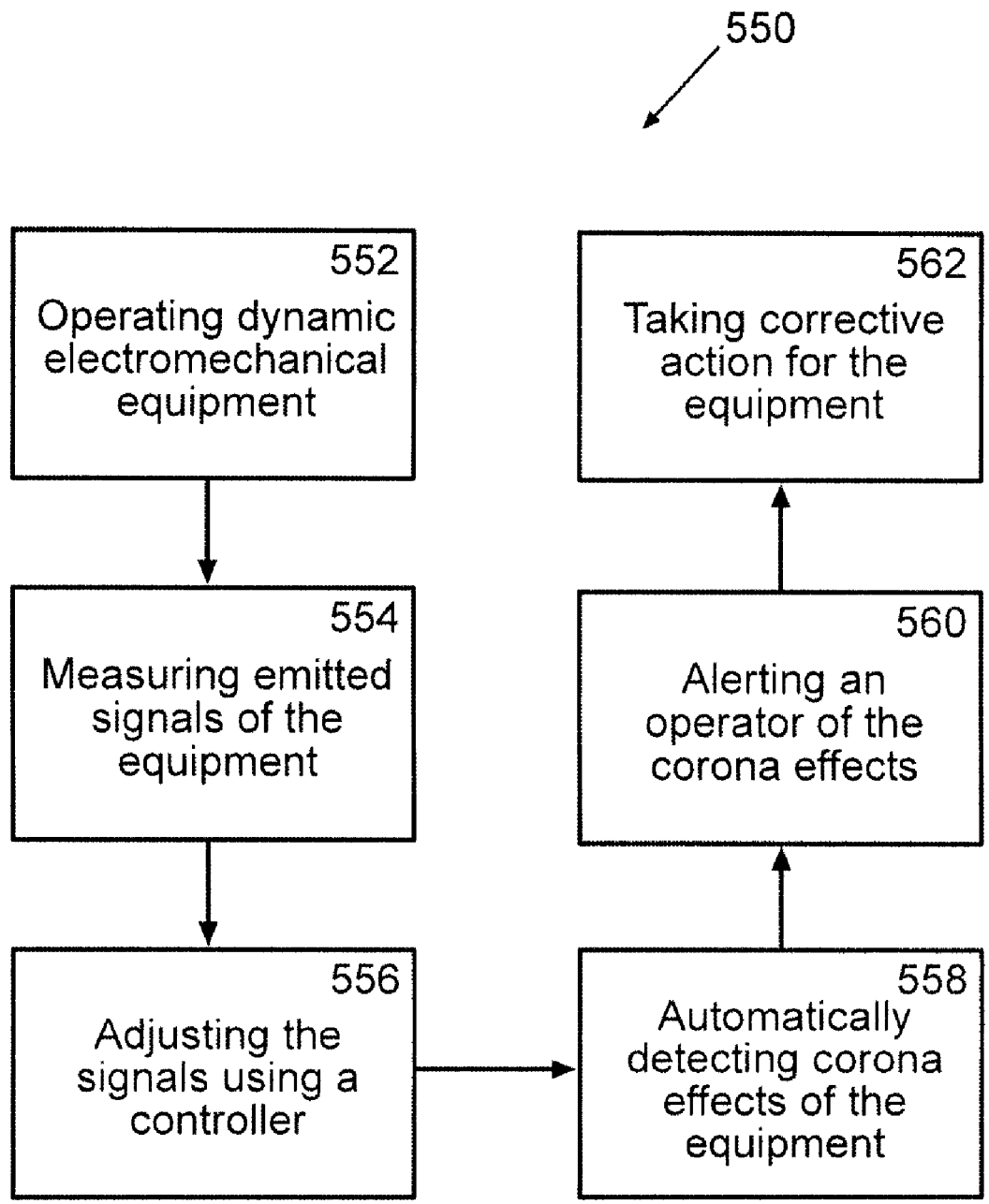
FIG. 5 is a flowchart of one embodiment of a method of automatically detecting corona effects in operating dynamic electromechanical equipment.

FIG. 5 is a flowchart of one embodiment of a method 550 of automatically detecting corona effects in operating dynamic electromechanical equipment 12/212. The dynamic electromechanical equipment 12/212 may comprise a motor, a generator, aircraft equipment, non-aircraft equipment, and/or another type of dynamic electromechanical equipment. In one step 552, dynamic electromechanical equipment 12/212 may be operated during regular, day-to-day operation. In another step 554, behavior of emitted signals 20/220/320/420 of the operating dynamic electromechanical equipment 12/212 may be measured using at least one sensor 14/214. The at least one sensor 14/214 may be connected to the operating dynamic electromechanical equipment 12/212. The at least one sensor 14/214 may comprise a current probe, a speed sensor, an encoder, a back EMF sensor, a hall-effect sensor, a volt-meter, and/or another type of sensor. In an additional step 556, the emitted signals 20/220/320/420 may be adjusted using a controller 16/216 to correct for errors detected by the at least one sensor 14/214 in the emitted signals 20/220/320/420. The controller 16/216 may be connected to the at least one sensor 14/214 and to the operating electromechanical equipment 12/212.

In still another step 558, corona effects of the dynamic electromechanical equipment 12/212 may be automatically detected using a corona phenomena detection device 18/218/318. The corona phenomena detection device 18/218/318 may comprise a high-bandwidth data acquisition device 322, a digital signal processor 324, and/or another type of device. The corona phenomena detection device 18/218/318 may be connected to the controller 16/216 and to the at least one sensor 14/214. The corona phenomena detection device 18/218/318 may be embedded in the controller 16/216. In another embodiment, the corona phenomena detection device 18/218/318 may have been connected to the dynamic electromechanical equipment 12/212 during manufacture of the dynamic electromechanical equipment 12/212. In still another embodiment, the corona phenomena detection device 18/218/318 may have been retrofitted to the dynamic electromechanical equipment 12/212.

Step 558 may comprise conducting data acquisition on the emitted signals 20/220/320/420. Step 558 may further comprise sampling, filtering and processing, and automatically detecting the corona effects of the emitted signals 20/220/320/420. Step 558 may also comprise: capturing a waveform of the emitted signals 20/220/320/420; doing a Fourier transformation on the captured waveform; extracting coefficients of the Fourier transformation of the captured waveform; averaging the extracted coefficients; extracting a signature using the averaged extracted coefficients; and detecting the corona effects of the operating dynamic electromechanical equipment 12/212 by comparing the extracted signature with a reference corona signature. The reference corona signature may comprise previously tested and determined corona signatures, which signify different stages of corona effects, of at least one of the operating dynamic electromechanical equipment 12/212 and second operating dynamic electromechanical equipment substantially similar to the operating dynamic electromechanical equipment 12/212. The reference corona signature may have been determined in a laboratory or during other experimental testing conditions.

Step 560 may comprise alerting an operator 334 of the detected corona effects. Step 562 may comprise the alerted operator 334 shutting down the operating dynamic electromechanical equipment 12/212, providing maintenance to the operating dynamic electromechanical equipment 12/212, repairing the operating dynamic electromechanical equipment 12/212, and/or taking another type of corrective action. In other embodiments, varying method steps may be utilized in order to automatically detect corona effects in operating dynamic electromechanical equipment 12/212.

One or more embodiments of the disclosure may reduce, and/or eliminate one or more of the problems encountered by one or more of the prior art systems and methods. For instance, one or more embodiments of the disclosure may provide automatic detection of corona effects in dynamic electromechanical equipment operating during regular, every-day use. This may result in: improved corona effect knowledge of the equipment during regular, day-to-day operation; better-maintained equipment; more reliable equipment; reduced risk of damage and/or failure of the equipment; reduced time delays; reduced cost; reduced need for testing equipment; and/or one or more other types of improvements.

It should be understood, of course, that the foregoing relates to exemplary embodiments of the disclosure and that modifications may be made without departing from the spirit and scope of the disclosure as set forth in the following claims.

The invention claimed is:

1. A system for automatically detecting corona effects in operating dynamic electromechanical equipment comprising:
    at least one sensor connected to operating dynamic electromechanical equipment for measuring behavior of emitted signals of the operating dynamic electromechanical equipment;
    a controller connected to the at least one sensor and to the operating dynamic electromechanical equipment for adjusting emitted signals of the operating dynamic electromechanical equipment to correct for errors detected by the at least one sensor in the emitted signals; and
    a corona phenomena detection device connected to the operating dynamic electromechanical equipment for automatically detecting corona effects of the operating dynamic electromechanical equipment using digital frequency domain processing to perform a Fourier transformation on a captured waveform of the emitted signals to digitally create a digital signature of the emitted signals;
    wherein the corona phenomena detection device comprises a capture component for capturing the captured waveform of the emitted signals, a signature extraction component for extracting the digital signature of the captured waveform based on the Fourier transformation, and a coefficient extraction component for extracting coefficients of the Fourier transformation.

2. The system of claim 1 wherein the operating dynamic electromechanical equipment comprises at least one of a motor, a generator, or aircraft equipment.

3. The system of claim 1 wherein the at least one sensor comprises at least one of a current probe, a speed sensor, an encoder, a back EMF sensor, a hall-effect sensor, or a voltmeter.

4. The system of claim 1 wherein the corona phenomena detection device comprises a high-bandwidth data acquisition device for conducting data acquisition on the emitted signals of the operating dynamic electromechanical equipment.

5. The system of claim 1 wherein the corona phenomena detection device comprises a digital signal processor.

6. The system of claim 5 wherein the digital signal processor comprises a signal sampling component for sampling the emitted signals of the operating dynamic electromechanical equipment, a filtering and processing component for filtering and processing the emitted signals of the operating dynamic electromechanical equipment, and a corona detection component for automatically detecting corona effects of the operating dynamic electromechanical equipment.

7. The system of claim 1 wherein the corona phenomena detection device comprises, a Fourier component for doing the Fourier transformation on the captured waveform captured by the capture component, a coefficient extraction component for extracting coefficients of the Fourier transformation, a mean coefficient component for averaging the extracted coefficients, the signature extraction component for extracting the digital signature using the averaged extracted coefficients, and a corona effect component for detecting corona effects of the operating dynamic electromechanical equipment based on a comparison of the extracted digital signature with a reference corona signature of the operating dynamic electromechanical equipment.

8. The system of claim 7 wherein the reference corona signature comprises previously tested and determined corona signatures, during different stages of corona effects, of at least one of the operating dynamic electromechanical equipment or second operating dynamic electromechanical equipment which is substantially similar to the operating dynamic electromechanical equipment.

9. The system of claim 1 wherein the system automatically detects corona effects in the dynamic electromechanical equipment during day-to-day operation of the equipment.

10. The system of claim 1 wherein the corona phenomena detection device is embedded in the controller.

11. The system of claim 1 wherein the corona phenomena detection device is connected to the controller and to the at least one sensor.

12. A method of automatically detecting corona effects in operating dynamic electromechanical equipment during operation comprising:
    operating dynamic electromechanical equipment;
    measuring behavior of emitted signals of the operating dynamic electromechanical equipment using at least one sensor;
    adjusting, using a controller, the emitted signals of the operating dynamic electromechanical equipment to correct for errors detected by the at least one sensor in the emitted signals; and
    automatically, with a corona phenomena detection device, detecting corona effects using digital frequency domain processing to perform a Fourier transformation on a captured waveform of the emitted signals to digitally create a digital signature of the emitted signals during operation of the dynamic electromechanical equipment by capturing the captured waveform of the emitted signals, extracting the digital signature of the captured waveform based on the Fourier transformation, and extracting coefficients of the Fourier transformation.

13. The method of claim 12 further comprising connecting the at least one sensor to the operating dynamic electromechanical equipment, connecting the controller to the at least one sensor and to the operating dynamic electromechanical equipment, and connecting the corona phenomena detection device to the dynamic electromechanical equipment.

14. The method of claim 12 wherein the dynamic electromechanical equipment comprises at least one of a motor, a generator, or aircraft equipment.

15. The method of claim 12 wherein the at least one sensor comprises at least one of a current probe, a speed sensor, an encoder, a back EMF sensor, or a hall-effect sensor.

16. The method of claim 12 wherein the corona phenomena detection device comprises a high-bandwidth data acquisition device and the automatically detecting step comprises conducting data acquisition on the emitted signals of the operating dynamic electromechanical equipment.

17. The method of claim 12 wherein the corona phenomena detection device comprises a digital signal processor.

18. The method of claim 12 wherein the automatically detecting step comprises sampling the emitted signals of the operating dynamic electromechanical equipment, filtering and processing the emitted signals of the operating dynamic electromechanical equipment, and automatically detecting the corona effects of the operating dynamic electromechanical equipment.

19. The method of claim 12 wherein the automatically detecting step comprises averaging the extracted coefficients, extracting the digital signature using the averaged extracted coefficients, and detecting the corona effects of the operating dynamic electromechanical equipment by comparing the extracted digital signature with a reference corona signature.

20. The method of claim 19 further comprising determining the reference corona signature by testing, during different stages of corona effects, at least one of the operating dynamic electromechanical equipment or second operating dynamic electromechanical equipment substantially similar to the operating dynamic electromechanical equipment.

21. The method of claim 12 further comprising providing an alert that corona effects have been detected in the dynamic electromechanical equipment.

22. The method of claim 21 further comprising at least one of shutting down the operating dynamic electromechanical equipment, providing maintenance to the operating dynamic electromechanical equipment, or repairing the operating dynamic electromechanical equipment.

23. The method of claim 12 further comprising embedding the corona phenomena detection device in the controller.

24. The method of claim 12 further comprising connecting the corona phenomena detection device to the controller and to the at least one sensor.

25. The system of claim 1 further comprising an alert component for providing an alert that corona effects of the operating dynamic electromechanical equipment have been detected.

26. The system of claim 1 wherein the corona phenomena detection device further comprises a mean coefficient component for averaging the extracted coefficients.

27. The system of claim 26 wherein the signature extraction component is for extracting the digital signature using the averaged extracted coefficients.

28. The system of claim 27 wherein the corona phenomena detection device further comprises a corona effect component for detecting corona effects of the operating dynamic electromechanical equipment based on a comparison of the extracted digital signature with a reference corona signature of the operating dynamic electromechanical equipment.

29. The method of claim 12 further comprising averaging the extracted coefficients.

30. The method of claim 29 further comprising extracting the digital signature using the averaged extracted coefficients.

31. The system of claim 1 wherein the controller is configured to automatically adjust the emitted signals of the operating dynamic electromechanical equipment and to automatically correct for the errors detected by the at least one sensor in the emitted signals.

32. The method of claim 12 wherein the adjusting, using the controller, the emitted signals of the operating dynamic electromechanical equipment further comprises automatically adjusting, using the controller, the emitted signals of the operating dynamic electromechanical equipment, and automatically correcting, using the controller, errors detected by the at least one sensor in the emitted signals.

* * * * *